United States Patent Office 3,378,602
Patented Apr. 16, 1968

3,378,602
TIRE CORD PREPARED FROM BLOCK COPOLYMERS OF POLYAMIDES AND POLYESTERS
James J. Robertson, Akron, Ohio, assignor to The Firestone Tire & Rubber Company, Akron, Ohio, a corporation of Ohio
Continuation of application Ser. No. 307,895, Sept. 10, 1963. This application Feb. 16, 1967, Ser. No. 616,737
11 Claims. (Cl. 260—857)

ABSTRACT OF THE DISCLOSURE

The flat spotting of nylon tires is overcome by copolymerizing 30 to 40 percent of a polyester with a melting point of at least 200° C. with 70 to 60 percent of a polyamide with a melting point of at least 175° C. to produce a copolymer with a melting point above 200° C.

---

Figure 1:
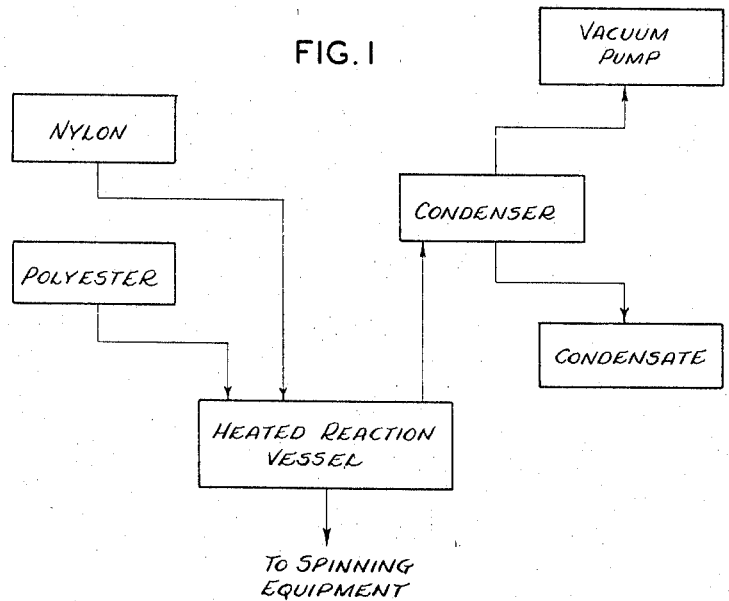

This application is a continuation of my application Serial No. 307,895 filed September 10, 1963 (now abandoned).

This invention relates to a block copolymer of polyamide and polyester, its preparation, fibers made from it and their use in tires.

Polyamides are receiving wide acceptance in various fields but have certain drawbacks which, if overcome, would expand their uses. For instance, as a tire fabric, they have proven very valuable even though the resulting so-called "flat-spotting" is very objectionable. This term is applied to the phenomenon of a tire flattening out in the footprint area, when it has stood for several hours, so that for some time after the tire is again put into use the flat spot causes bumping. Flat-spotting is greatly reduced in tires fabricated from fibers spun from the copolymer of this invention.

Spun polyamide fibers have some creep and shrinkage, especially at elevated temperatures, even after heat treating. Fibers spun from the copolymer of this invention have less creep and shrinkage.

Polyester fibers are known to have high modulus and are relatively free from flat-spotting. On the other hand polyamide fibers have relatively low modulus but are subject to flat-spotting. The fibers of this invention are produced from these two polymers. When such polymers are mixed they are incompatible and produce poor fibers. By the process of this invention we have been able to react the two polymers to the extent that they become compatible and produce fibers with desirable properties including substantial freedom from flat-spotting. In producing a copolymer from these two polymers, if the reaction is carried to too great an extent the fibers produced from the product are low melting and are quite subject to flat-spotting. By regulating the copolymerization as herein described fibers are obtained with good strength and other properties which are desirable from a textile standpoint. Tires made from cords made from such fibers are substantially free from flat-spotting. As will be shown, the evidence indicates that this desirable copolymer is relatively a block copolymer, and if the reaction is carried too far, equilibration takes place producing a random copolymer with resultant lowered melting point and fibers produced from the product are subject to flat-spotting.

Various aromatic dicarboxylic acids may be used in producing the polyester utilized in carrying out the invention, as will appear from what follows. The polyesters employed have the formula (1) $HO(CH_2)_a-[O-CO-Aryl-CO-O(CH_2)_b-]_xOH$ The polyesters preferred for use in tire cord are obtained from terephthalic acid and have the formula:

(1-a) 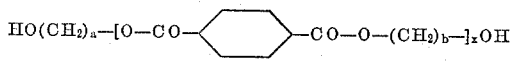

The polyamide used in the process of this invention may be derived from a cyclic lactam or the reaction product of a dibasic acid and a diamine, and either the cyclic lactam or the reaction product may be reacted with an alkylene diamine to form a polyamide with greater than 50 percent amino end groups. The polyamide is selected from the class consisting of (2) A polylactam having the formula $$H[HN(CH_2)_cCO-]_mOH$$

(3) A reaction product of an aliphatic dibasic acid and an aliphatic diamine having the formula $$HO[CO-(CH_2)_d-CO-NH-(CH_2)_eNH-]_yH$$

or (4) A reaction product of either of the foregoing with an alkylene diamine, as represented by the formulae (5)  $H[HN(CH_2)_cCO-]_m-NH(CH_2)_fNH_2$ and (6) $H_2N-(CH_2)_f-NH[CO-(CH_2)_d$
         $-CONH-(CH_2)_e-NH-]_yH$ In the foregoing formulae—

"Aryl" indicates a bivalent aromatic radical, which is preferably symmetrical;

$a$, $b$, $d$, $e$ and $f$ are each small numbers in the range of 2 to 10, and when occurring in any one formula they may be the same or different;

$c$ is 3 to 10;

$m$ is 10 to 300, and preferably 80 to 200 for tire cord;

$x$ is 10 to 150, and preferably 25 to 100 for tire cord;

$y$ is 10 to 200, and preferably 20 to 125 for tire cord.

The sum of the molecular weight of the polyester of Formula 1, plus the molecular weight of the polyamide (given by one of the Formulae 2, 3, 4, 5 or 6 should be in the fiber-forming range, say, at least about 10,000. The polyamide may be a mixture of the foregoing as, for instance, a mixture in which an alkylene diamine has been reacted with only a part of the polylactam or the reaction product of the dibasic acid and the diamine.

The polyester is derived from an aryl dicarboxylic acid. In the production of the polyester, the acid is reacted with a diol such as ethylene glycol, butane diol-1,4, propane diol-1,3, etc. The diol may comprise as many as 8 or more carbon atoms. The polyester must have a melting point at least as high as 200° C. and preferably it is higher, such as, for example, 225° C., or 250° C. or as high as 275° C. or more. A polyester with a melting point of at least 200° C. is required in fibers for tire cord, and usually it is a terephthalate. The aryl dicarboxylic acids are preferably symmetrical, although they are not necessarily so except for tire fabrics, and they include, for example, terephthalic acid, isophthalic acid, symmetrical biphenyl dicarboxylic acid, diphenyl methane dicarboxylic acid (preferably the 4,4'-isomer), diphenyl sulfone dicarboxylic acid (preferably the 4,4'-isomer), diphenyl-1,2-ethane dicarboxylic acid, the naphthoic and anthracene dicarboxylic acids and mixtures of the foregoing. The acids contain from 8 to 16 or more carbon atoms. The polyesters include, for example, polyethylene terephthalate, polytetramethylene terephthalate, copolymers of ethylene glycol with terephthalic and isophthalic acids, etc.

The polyamide must have a melting point at least as high as 175° C. or 200° C., and preferably higher, such as, for example, 225 or even 240 or 250 or 275° C. For fibers for use in tires, the melting point should be at least 200° C. Polyamides which may be used include those derived from dicarboxylic acids, such as, for example, succinic acid, glutaric acid, adipic acid, pimelic acid, suberic acid, azelaic acid, and sebacic acid; and from diamines containing, for example, 2 to 10 carbon atoms, such as ethylene diamine, tetramethylene diamine, hexamethylene diamine, octamethylene diamine, 1,4-di(methylamino)cyclohexane, as for example, Nylon 66 or Nylon 610, etc.; or the nylon may be derived from an omega-amino carboxylic acid such as omega-amino-butyric acid, omega-aminopimelic acid, omega-aminocaproic acid, etc., or the lactams thereof. Thus, the plastic may be made utilizing Nylons 4, 5, 6, 7, 8 and 11. As indicated by the foregoing formulae, the polyamide may be prepared from a lactam or a lactam to which an alkylene diamine has been added during polymerization or by post-treatment of a polyamide which contains carboxyl groups; or the polyamide may be prepared from a reaction product of a dicarboxylic acid and a diamine, and in preparing such a reaction product a slight excess of an aliphatic diamine such as ethylene diamine, tetramethylene diamine, hexamethylene diamine, etc. may be added during polymerization or by post-treatment of the polyamide.

In ordinary commercial production, diamines are not added in producing polylactams, and the polymers will have approximately 50 percent amino end groups. For the production of nylon-polyester copolymers, as herein contemplated, nylons produced by diamine addition will contain greater than 50 percent amino end groups, and may contain as many as 100 percent amino end groups.

The polyetser and polyamide may be reacted in any relative proportions such that the ratio of hydroxyl end units in the polyester to the amino end units in the polyamide is in the range of 2:1 to 1:2 and preferably 0.8:1 to 1.7:1. The higher the percentage of polyester, the greater the diminution of flat-spotting, although flat-spotting may be substantially reduced even with a high percentage of polyamide in the polymer.

The polymerization reaction is carried out by heating in an inert atmosphere until the physical blend becomes molten, which takes place at a temperature of 260 to 290° C., preferably 275 to 280° C. When the mixture becomes molten, a vacuum is maintained sufficient to remove the volatile reaction products. On removal of these, the resulting reaction product is substantially insoluble in boiling o-dichlorobenzene. Solubility in o-dichlorobenzene will be expressed, hereinafter, as the percentage, based on the weight of reaction product, of material which can be extracted therefrom by 100 grams of boiling o-dichlorobenzene. A product will be considered substantially insoluble if not more than about 5 percent of material is extractable in this way. The vacuum is discontinued and the polymer is removed from the heating zone before the melting point of the product drops below that of the lowest melting constituent employed. For tire cord, the product must have a melting point of at least substantially 200° C. Melting point, as used herein, means the lowest temperature at which disappearance of crystallinity is noted under a hot-stage microscope.

It is the resulting block copolymer of higher melting point to which the invention relates. Continued heating causes depression of the melting point apparently due to random equilibration forming a random copolymer, which indicates that the desirable product is a block copolymer. Although lowering of the melting point is not to be avoided entirely, it is the high melting point product, which apparently is essentially a block copolymer, which has the desirable properties which characterize the polyamide-polyester polymer of this invention.

Within the ranges of variation discussed above, particularly excellent resins for fabrication into tire cord of reduced flat-spotting are obtained when the polyester resin is specifically polyethylene terephthalate; when the polyamide resin is a polycaprolactam which has been prepared in the presence of a diamine, or post-reacted with a diamine, so as to have a relatively enhanced proportion of amine end groups, say 70 percent or better of all endgroups being amine end groups, as in Formula 5 above; when the weight proportion of polyamide entering into the copolymer is in the range of 55–85 percent, preferably 60–70 percent, based on the total weight of nylon and polyester entering into the copolymer; and when the ratio of gram-equivalents of hydroxyl end groups contained in the polyester used to the gram-equivalents of amine end-groups contained in the polyamide used is between about 0.8:1 to 1.7:1. For best results, the constituents should be separately melted, and the melts mixed, or the solid constituents melted together, in an anaerobic zone, as under nitrogen. The melt comprising the mixed ingredients must be heated in the reaction zone under a vacuum such as to remove the evolved glycol as rapidly as possible; to whatever degree free glycol is permitted to reside in the reaction zone, it brings about a rearrangement and equilibration of the copolymer, thereby detracting from its properties. The reaction should be continued until not more than 5 percent of the polymer is extractable by 100 grams of boiling o-dichlorobenzene per gram of polymer. The competing deleterious quilibration reaction is also in operation, and therefore, when the desired degree of o-dichlorobenzene insolubility has been achieved, reaction conditions should be terminated before the melting point (which decreases as the randomization proceeds) falls below the lowest-melting of any ingredient (polyester or polyamide) charged, and preferably before the melting point has dropped below about 225° C. This may be done by quickly cooling the reaction mass to room temperature, for instance by directly extruding the mass in the filamentary form in which it is to be used.

Thus it appears that under the preferred conditions for the reaction of the two polymers a block copolymer is formed, which if exposed to equilibration conditions approaches the structure of a random copolymer.

The reaction product formed in the molten state, may be solidified by cooling, and stored and subsequently used as desired. The copolymer and production of fiber may be made by a continuous process, and may advantageously be carried out in a screw extruder connected with a vacuum pump. The copolymer may be hot spun as it is removed from the reaction vessel on a continuous basis, utilizing any known equipment and procedure for melt spinning, etc., or the cooled product may be spun by any technique known to the art, as by melt spinning, dry spinning, etc. The polymer should not undergo any prolonged preheating nor should it be maintained at the reaction temperature for any prolonged time, as this will cause equilibration with a drop in the melting point and less freedom from flat-spotting in a tire fabricated from it.

To determine the amount of flat-spotting which occurs in a tire made from a cord or multi-filaments of a certain structure, the cord or multi-filaments are subjected to a response-lag test, as follows:

RESPONSE-LAG TEST

The test is conducted on 1680 denier cord or multi-filaments referred to herein as the test material. The test is conducted at 75° F., 55% relative humidity.

With a 50-centimeter length of the test material suspended at one end, a 3-pound load is placed on the other end for 4 hours. The length is recorded. This corresponds to the inflation pressure of a tire.

Two pounds of the weight are removed, leaving a one-pound load which remains for 16 hours.

This corresponds to the pressure in the footprint area.

The 2-pound weight is then replaced. This corresponds to the return to tension caused by inflation pressure as the test material leaves the footprint area. The test material will not return to its normal length in 12 seconds and its length at the end of that time is measured.

The difference between (a) the length of the test material after standing 4 hours under a 3-pound load, and (b) the length of the test material 12 seconds after the 3-pound load has been reapplied as described, is the response lag expressed in mils.

This value has been found to correlate very well with the flat-spotting in tires. The lower the response-lag the more complete is the elimination of flat-spotting. A so-called "response-lag" of 100 mils or less, when tested as multi-filament yarn, indicates a substantial reduction in flat-spotting.

The invention is illustrated by the following examples:

EXAMPLE 1

Four runs were made. These are summarized in the following table.

TABLE 1

| Run No. | 1 | 2 | 3 | 4 |
|---|---|---|---|---|
| Nylon 6, parts | 65 | 65 | 65 | 65 |
| PET,* parts | 35 | 35 | 35 | 35 |
| Ratio of OH/NH$_2$ | 1.3/1 | 1.3/1 | 1.3/1 | 1.3/1 |
| Reaction Time: | | | | |
| Melt time, min | 15 | 20 | 30 | 30 |
| Vacuum time, min | 30 | 40 | 60 | 120 |
| Melting Point, °C | <200 | <200 | 170 | |
| Solubility in o-dichlorobenzene, percent | >1 | >1 | 2.4 | 5.2 |
| Response lag, mils: | | | | |
| Commercial Nylon 6 | 171 | 171 | | |
| Copolymer | 75 | 90 | | |

*Polyethylene terephthalate.

PREPARATION OF THE NYLON

The nylon 6 was prepared by reacting 100 parts of polycaprolactam and 1.20 parts of 50 percent aqueous hexamethylene diamine for 16 hours at 256° C. in a closed container. The purpose is to increase the percentage of amine end groups for reaction with the polyester. The resultant polymers are ground in a Wiley mill, washed with deionized water for 16 hours at 70° C. and dried for 16 hours at 80° C. in a vacuum dryer. The total polymer yield was 90 percent. The relative viscosity of the nylon as determined on a one percent solution by volume in concentrated sulphuric acid was 2.01, indicating a molecular weight of approximately 12,500. The percentage of amine end groups in the copolymer was calculated as follows, taking as a basis 100 grams of the original charge:

Grams of polymer obtained = $100 \times .90 = 90$ grams.

Mols of polymer obtained = $90/12,500 = .0072$ mol.

Equivalents of NH$_2$ derived from caprolactam = mols of polymer = .0072 eq.

Assuming all hexamethylene diamine was incorporated into the polymer:

Equivalents of NH$_2$ from diamine = mols of diamine = $1.2 \times .50/116 = .0052$ eq.

Total equivalents of NH$_2$ groups = $.0072 + .0059 = .0123$.

Total equivalents of end groups = 2X mols of polymer = $2 \times .0072 = .0144$.

Percent of NH$_2$ end groups = $.0123/.0144 \times 100\% = 86\%$.

PREPARATION OF THE POLYESTER

The polyester was prepared by reacting 194 parts dimethyl terephthalate, 124 parts ethylene glycol, 0.06 part antimony trioxide and 0.10 part manganese acetate. The reaction was carried out in a three-neck flask fitted with a mechanical stirrer, a nitrogen inlet tube and a take-off condenser. The reaction was heated by means of a Glascol heating mantle to 156° C. at which time the methanol which was formed began to distill. The reaction temperature was raised to 249° C. over a period of three hours, all methanol having been removed at this time. A vacuum of 4–5 mm. was slowly applied with the temperature rising to a maximum of 280° C. The reaction was continued for 5 hours under a vacuum of 4–5 mm. to give a polyester with an intrinsic viscosity of 0.26 as measured at 25° C. in a 50/50 solution of phenol and tetrachloroethane, indicating a molecular weight of 5800.

The above charge will contain:

Equivalents of hydroxyl groups = $2 \times$ moles of polyester = $2 \times 35/5800 = .012$ equ.

Equivalents of NH$_2$ groups = $2 \times$ moles of polyamide $\times$ percent NH$_2$ end groups = $2 \times 65 \times .86/12,500 = .009$.

Ratio of OH/NH$_2$ = $.012/.009 = 1.3:1$.

Values for percentages of amine end groups and for ratios of OH/NH$_2$ set forth in the succeeding examples were calculated similarly as in the present example.

PREPARATION OF NYLON-POLYESTER BLOCK COPOLYMER

The copolymerization was carried out by charging 65 g. of Nylon 6 to a 500 cc. round-bottom flask, fitted with a mechanical stirrer, nitrogen inlet tube, and a take-off condenser. The flask and contents under a blanket of dry N$_2$, were immersed in a metal bath at such a temperature as to bring the contents of the reaction flask to 275–280° C. When the nylon had melted, 35 g. polyester was added and stirred until the reaction mass was molten. (The time required to melt the polyester is listed in the above Table I as Melt Time.) A vacuum of less than 5 mm. was then applied until such time as the reaction mass became very viscous. Sufficient vacuum is applied to remove the glycol formed in the copolymerization, which, if not removed, causes equilibration by reaction with the nylon and polyester, yielding products of lower melting point and higher extractability than when equilibration is prevented.

The polymer was then cooled under a blanket of dry N$_2$, the flask broken away, and the polymer ground in a Wiley mill. Solubility in boiling o-dichlorobenzene and crystalline melt point (hot-stage polarizing microscope method) were determined, and are recorded in the table. The polymer was vacuum dried and spun as multi-filament yarn. Response lag was then determined.

The melt time and time of vacuum treatment varied in the various runs. The longer periods of heating at polymer melt temperatures favored equilibration. This produced products of lower melting points and higher solubility in boiling o-dichlorobenzene, as shown in the table. For tire fabric, the solubility in o-dichlorobenzene should not exceed 5 percent. Thus Runs No. 3 and 4 did not give a fiber suitable for tire fabric.

The ratio of OH/NH$_2$ refers to the ratio of terminal OH-groups in the polyester units to the ratio of NH$_2$- groups in the nylon units. When this ratio equals one, there is no limitation on the possible length of the copolymer chains.

EXAMPLE 2

Four runs were made, using nylon and polyester prepared as described in Example 1, and the same general procedure was followed. The molecular weight of the nylon was the same (12,500) in all runs, while molecular weight of the polyester was varied, and its effect determined.

The polyethylene terephthalate preparations were carried out to different degrees of polymerization and the ratio of nylon to polyethylene terephthalate adjusted to provide ratios of hydroxyl to amino groups as indicated in Table II.

In general as the polyester content of the polymer increases, the response lag is lowered, and from a comparison of Runs No. 2 and 4 it is evident that as the molecular weight of the polyester is increased there is a reduction of response lag.

TABLE II

| Run No. | 1 | 2 | 3 | 4 |
|---|---|---|---|---|
| Nylon 6, parts | 65 | 68 | 63 | 59 |
| PET, parts | 35 | 32 | 37 | 41 |
| Ratio of $OH/NH_2$ | 1.3/1 | 1/1 | 1/1 | 0.9/1 |
| PET, Intrinsic Viscosity | 0.26 | 0.31 | 0.37 | 0.43 |
| PET, molecular weight | 5,800 | 7,100 | 9,000 | 11,000 |
| Reaction Time: | | | | |
| Melt time, min | 25 | 17 | 40 | 15 |
| Vacuum time, min | 60 | 30 | 30 | 15 |
| Intrinsic Viscosity of Copolymer | 1.02 | 0.95 | 0.82 | 0.95 |
| Crystalline, M.P. | >200 | >200 | >200 | >200 |
| Solubility in o-dichloro-benzene, percent | 3 | 1.6 | 3.1 | 2.2 |
| Response lag: | | | | |
| Nylon 6* (Control) | 161 | 161 | 171 | 165 |
| Copolymer | 73 | 67 | 57 | 55 |

*In this and succeeding examples, controls were run with commercial nylons on the same day as the copolymers under test. On account of environmental and machine conditions, these vary somewhat from day to day.

Each of these four products is satisfactory for tire fabric. The melting points are above 200° C., and the solubilities are low. Equilibration was minimized.

EXAMPLE 3

This example illustrates that the molecular weight of both the nylon and the polyester may be varied over a considerable range with considerable improvement in response lag. In general the response lag decreases with increasing molecular weight of these ingredients. During the preparation of the copolymer of Run No. 2 the temperature was below 260° C. for an appreciable time during the melting stage of the polymer which extended the melt period. The general procedure of Example 1 was followed, with variations as indicated in the following table.

TABLE III

| Run No. | 1 | 2 | 3 |
|---|---|---|---|
| Nylon 6, parts | 60 | 63 | 64 |
| Nylon 6, mol. wt. | 8,000 | 12,500 | 17,700 |
| Nylon 6, Percent $NH_2$ end groups | 95 | 86 | 88 |
| PET, parts | 40 | 37 | 36 |
| PET, mol. wt. | 4,500 | 9,000 | 11,100 |
| Ratio of $OH/NH_2$ | 1.2/1 | 1/1 | 1/1 |
| Reaction Time: | | | |
| Melt time, min | 11 | 40 | 17 |
| Vacuum time, min | 29 | 30 | 25 |
| Crystalline melting point, °C | >200 | >200 | >200 |
| Solubility in o-dichlorobenzene, percent | 1 | 3.1 | 2.4 |
| Intrinsic Viscosity of Copolymer | | 0.82 | 1.08 |
| Response Lag, mils: | | | |
| Nylon 6 | *123 | 171 | 169 |
| Copolymer | *94 | 57 | 57 |

* Monofilament.

EXAMPLE 4

This example employed commercial Nylon 66 and demonstrates that fibers with reduced response lag can be prepared from this material using the process of this invention. Nylon 66 is presumed to answer to Formula 3 above and therefore to have 50 percent of amine end-groups. The procedure of Example 1 was followed, with variations indicated below.

TABLE IV

| | |
|---|---|
| Nylon 66,¹ parts | 68 |
| PET, parts | 32 |
| Ratio of $OH/NH_2$ | 1/1 |
| Mol. wt. Nylon 66 | 24,000 |
| Mol. wt. PET | 11,000 |
| Reaction time: | |
| Melt time, min. | 17 |
| Vacuum time, min. | 17 |
| Crystalline M.P., °C. | >240 |
| Solubility in o-dichlorobenzene, percent | 1.8 |
| Response lag, mils: | |
| Nylon 66 | 107 |
| Copolymer | 86 |

¹ Polyhexamethylenediamine adipamide.

EXAMPLE 5

The nylons used in this example were prepared by polymerizing caprolactam at 256° C. in the presence of water to produce polymers containing equal quantities of amine and carboxyl end groups.

The general procedure was the same as in Example 1 with variations as indicated in the following table.

This example shows that the nylon from ordinary hydrolytic polymerization can be used in making the copolymer of this invention.

TABLE V

| Run No. | 1 | 2 |
|---|---|---|
| Nylon 6, parts | 67 | 67 |
| PET, parts | 33 | 33 |
| Ratio of $OH/NH_2$ | 1.7/1 | 1.45/1 |
| Nylon 6, mol. wt. | 18,500 | 15,900 |
| PET, mol. wt. | 10,700 | 10,700 |
| Crystalline M.P., °C. | >200 | >200 |
| Solubility in o-dichlorobenzene, percent | 1 | 1.7 |
| Reaction time: | | |
| Melt time, min | 65 | 72 |
| Vacuum time, min | 22 | 23 |
| Response lag: | | |
| Control Nylon 66 | 160 | 160 |
| Copolymer | 65 | 72 |

EXAMPLE 6

This example illustrates that a polycaprolactam containing more than 50 percent end groups polymerized in the presence of ethylene diamine may be used to prepare the copolymer of this invention.

TABLE VI

| Run No. | 1 | 2 |
|---|---|---|
| Nylon 6, parts | 60 | 65 |
| PET, parts | 40 | 35 |
| Ratio of $OH/NH_2$ | 1.41/1 | 1/1 |
| Nylon 6, mol. wt. | 9,000 | 13,000 |
| PET, mol. wt. | 4,500 | 8,200 |
| Crystalline M.P., °C. | >200 | >200 |
| Solubility in o-dichloro-benzene, percent | 3.2 | |

The copolymers had the same excellent qualities characterizing the products of other examples.

The invention is further described in connection with the accompanying drawings, in which—

Figure 2:
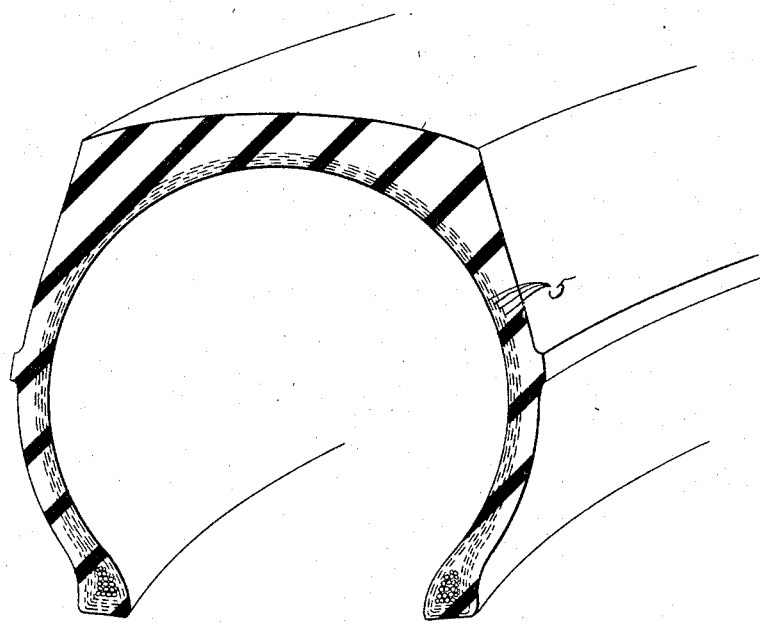

FIGURE 1 is schematic in nature of a flow sheet showing how the process is carried out; and FIGURE 2 is a section through a tire utilizing the new nylon-polyester copolymer fibers.

The fibers to be used in tires are stretched during the spinning and then twisted into cords, and these cords are then fabricated into tire plies and incorporated into a tire. In all of the known tire structures using nylon fibers, flat-spotting is inherent. Utilizing any such construction, a tire of four plies 5 (in FIGURE 2), each made from fibers produced from nylon-polyester copolymer produced according to this invention, shows little or no flat-spotting. The fibers have unusual dimensional stability.

The fabric of the tire may, for example, be made of fibers of nylon-polyester polymer of this invention which has a melting point of over 200° C. and may even melt as high as 225 or 250, or even 275 or 300° C. The polymer is preferably produced by a continuous process in a vacuumized extruder, and spun directly from the molten polymer as it is extruded, in equipment such as illustrated in FIGURE 1.

I claim:

1. A tire which is substantially free from flat spotting and having in the carcass thereof cords composed of block copolymer of (1) 30 to 40 percent of a polyester with a melting point of at least 200° C. which has the formula $$HO(CH_2)_a—[O—CO—Aryl—CO—O—(CH_2)_b—]_xOH$$

(2) 70 to 60 percent of a polyamide having at least 70 percent amino end groups and a melting point of at least 175° C. and selected from the class having the formulae (A) H[HN(CH$_2$)$_c$CO—]$_m$OH
(B) HO[CO—(CH$_2$)$_d$—CO—NH—(CH$_2$)$_e$NH—]$_y$H
(C) H[HN(CH$_2$)$_c$CO—]$_m$—NH(CH$_2$)$_f$NH$_2$
and
(D) H$_2$N—(CH$_2$)$_f$—NH[CO—(CH$_2$)$_d$—CONH—(CH$_2$)$_e$—NH—]$_y$H in which
$a$, $b$, $d$, $e$ and $f$ are each small numbers in the range of 2 to 10;
$c$ is 3 to 10;
$m$ is 10 to 300;
$x$ is 10 to 150; and
$y$ is 10 to 200;

said percentages being based on the total weight of amide and polyester, and the ratio of the hydroxyl end units in the polyester to the amine end units in the polyamide being in the range of 2:1 to 1:2; the copolymer being substantially insoluble in boiling o-dichlorobenzene and having a melting point above 200° C.

2. The tire of claim 1, the cords of which are composed of a block copolymer in which the polyamide has the said formula B, $d$ is 4, $e$ is 6 and $y$ is not over 150.

3. The tire of claim 1, the cords of which are composed of a block copolymer in which the polyamide has the said formula A, $c$ is 5 and $m$ is not over 250.

4. The tire of claim 7 in which the polyester is a terephthalate.

5. The tire of claim 1, the cords of which are composed of a block copolymer in which the polyamide is a lactam.

6. The tire of claim 1, the cords of which are composed of a block copolymer in which the polyamide is the reaction product of polycaprolactam and hexamethylene diamine.

7. The tire of claim 1, the cords of which are composed of a block copolymer in which the polyamide is the reaction product of a polycaprolactam and an alkylene diamine.

8. The tire of claim 1 in which the fibers in the cords in the carcass are composed substantially of a block copolymer in which the polyamide has the said formula D in which $m$ is 80 to 100, $x$ is 25 to 100 and $y$ is 20 to 125; the polyester is a terephthalate; the ratio of hydroxyl end units in the polyester to the amine end units in the polyamide is in the range of 0.8:1 to 1.7:1; and the fibers tested as multi-filament yarn have a response-lag no greater than 100 mils.

9. The method of producing a block copolymer suitable for the preparation of tire cord which comprises melting
60 to 70 percent of polyhexamethylenediamine adipamide with a molecular weight of substantially 24,000 and having at least 70 percent amino end groups, and
40 to 30 percent of polyethylene terephthalate with a molecular weight of substantially 11,000,
said percentages being based on the total weight of said amide and polyester,
maintaining the molten material in a reaction zone under a reduced pressure to vaporize volatile matter produced in the copolymerization until the resulting product is substantially insoluble in boiling o-dichlorobenzene, and then removing the molten product from the reaction zone before the melting point of the product drops below 240° C.

10. The method of producing a block copolymer suitable for the preparation of tire cord which comprises melting
32 percent of polyethylene terephthalate with a molecular weight of substantially 7100, and
68 percent of polycaprolactam and having at least 70 percent amino end groups,
said percentage being based on the total weight of said polyethylene terephthalate and polycaprolactam,
maintaining the molten material in a reaction zone under a reduced pressure for not more than 30 minutes to vaporize volatile matter produced in the polymerization until the resulting product is substantially insoluble in boiling o-dichlorobenzene, and then
removing the molten product from the reaction zone before the melting point of the product drops below 200° C.

11. Tire cord composed of block copolymer of
(1) 30 to 40 percent of a polyester with a melting point of at least 200° C. which has the formula

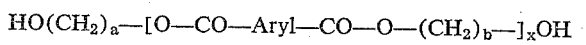

HO(CH$_2$)$_a$—[O—CO—Aryl—CO—O—(CH$_2$)$_b$—]$_x$OH (2) 70 to 60 percent of a polyamide having at least 70 percent amino end groups and a melting point of at least 175° C. and selected from the class having the formulae (A) H[HN(CH$_2$)$_c$CO—]$_m$OH
(B) HO[CO—(CH$_2$)$_d$—CO—NH—(CH$_2$)$_e$NH—]$_y$H
(C) H[HN(CH$_2$)$_c$CO—]$_m$—NH(CH$_2$)$_f$NH$_2$
and
(D) H$_2$N—(CH$_2$)$_f$—NH[CO—(CH$_2$)$_d$—CONH—(CH$_2$)$_e$—NH—]$_y$H in which
$a$, $b$, $d$, $e$ and $f$ are each small numbers in the range of 2 to 10;
$c$ is 3 to 10;
$m$ is 10 to 300;
$x$ is 10 to 150; and
$y$ is 10 to 200;

said percentages being based on the total weight of amide and polyester, and the ratio of the hydroxyl end units in the polyester to the amine end units in the polyamide being in the range of 2:1 to 1:2; the copolymer being substantially insoluble in boiling o-dichlorobenzene and having a melting point about 200° C.

References Cited

UNITED STATES PATENTS 2,623,031   12/1952   Snyder _____ 260—860
2,755,214   7/1956    Lyons _____ 154—52

FOREIGN PATENTS 132,546   5/1949   Australia.

MURRAY TILLMAN, *Primary Examiner.*

GEORGE F. LESMES, *Examiner.*

P. LIEBERMAN, *Assistant Examiner.*